US011886397B2

(12) United States Patent
Moresmau et al.

(10) Patent No.: US 11,886,397 B2
(45) Date of Patent: Jan. 30, 2024

(54) MULTI-FACETED TRUST SYSTEM (71) Applicant: ASG Technologies Group, Inc., Waltham, MA (US)

(72) Inventors: Jean-Philippe Moresmau, Saint Guilhem le Desert (FR); Marcus MacNeill, Austin, TX (US)

(73) Assignee: ASG Technologies Group, Inc., Waltham, MA (US)

( * ) Notice: Subject to any disclaimer, the term of this patent is extended or adjusted under 35 U.S.C. 154(b) by 45 days.

(21) Appl. No.: 16/795,570

(22) Filed: Feb. 19, 2020

(65) Prior Publication Data
US 2021/0117394 A1 Apr. 22, 2021

Related U.S. Application Data (60) Provisional application No. 62/923,377, filed on Oct. 18, 2019.

(51) Int. Cl.
*G06F 16/215* (2019.01)
*G06F 16/2457* (2019.01)

(52) U.S. Cl.
CPC ...... *G06F 16/215* (2019.01); *G06F 16/24573* (2019.01)

(58) Field of Classification Search
CPC ............. G06F 16/24573; G06F 16/215; G06F 2221/033; G06F 21/577; G06F 21/6218
USPC ........................................................ 707/692
See application file for complete search history.

(56) References Cited

U.S. PATENT DOCUMENTS

| 5,321,610 A | 6/1994 | Breslin |
| 5,528,263 A | 6/1996 | Platzker et al. |
| 5,742,285 A | 4/1998 | Ueda |
| 6,069,957 A | 5/2000 | Richards |
| (Continued) | | |

FOREIGN PATENT DOCUMENTS

| EP | 3430529 A1 | 1/2019 |
| EP | 3714604 A1 | 9/2020 |
| (Continued) | | |

OTHER PUBLICATIONS

"International Search Report" and "Written Opinion of the International Searching Authority," Patent Cooperation Treaty Application No. PCT/US2017/022295, dated Jun. 1, 2017, 9 pages.

(Continued)

*Primary Examiner* — Albert M Phillips, III
(74) *Attorney, Agent, or Firm* — Carr & Ferrell LLP (57) ABSTRACT

Provided are methods and systems for determining multi-faceted trust scores for data. A method may commence with receiving data and determining a plurality of metadata items associated with the data. The method may continue with determining one or more facets associated with each of the plurality of metadata items. The method may further include determining a parameter and a weight associated with each of the one or more facets. Upon determining the parameter and the weight, a trust score associated with each of the plurality of metadata items may be calculated based on the parameter and the weight associated with each of the one or more facets. The method may further include calculating a multi-faceted trust score of the data based on the trust score of each of the plurality of metadata items.

23 Claims, 5 Drawing Sheets

(56) References Cited

U.S. PATENT DOCUMENTS

| | | |
|---|---|---|
| 6,208,345 B1 | 3/2001 | Sheard et al. |
| 6,331,855 B1 | 12/2001 | Schauser |
| 6,574,321 B1 | 6/2003 | Cox et al. |
| 6,597,363 B1 | 7/2003 | Duluk |
| 6,950,825 B2 | 9/2005 | Chang et al. |
| 7,073,164 B1 | 7/2006 | Knowles |
| 7,185,192 B1 | 2/2007 | Kahn |
| 7,359,076 B2 | 4/2008 | Uchino |
| 7,937,665 B1 | 5/2011 | Vazquez et al. |
| 8,078,731 B1 | 12/2011 | Bruder et al. |
| 8,667,456 B1 | 3/2014 | Czymontek |
| 8,745,011 B2* | 6/2014 | Kishi ................ G06F 16/215 |
| | | 707/692 |
| 9,032,076 B2 | 5/2015 | Buehler et al. |
| 9,053,295 B1 | 6/2015 | Wick et al. |
| 9,213,707 B2 | 12/2015 | Conner |
| 9,232,491 B2 | 1/2016 | Mahaffey |
| 9,483,537 B1 | 11/2016 | Peters et al. |
| 9,621,428 B1* | 4/2017 | Lev .................. H04L 41/0806 |
| 9,910,655 B1 | 3/2018 | Ranganathan et al. |
| 10,162,624 B1 | 12/2018 | Moturu et al. |
| 10,181,059 B1 | 1/2019 | Brewton et al. |
| 10,355,864 B2 | 2/2019 | Konduru |
| 10,318,762 B1 | 6/2019 | Buckingham et al. |
| 10,348,505 B1* | 7/2019 | Crawforth ............ H04L 9/3297 |
| 10,812,611 B2 | 10/2020 | Bennet et al. |
| 10,877,740 B2 | 12/2020 | Bennet et al. |
| 11,055,067 B2 | 7/2021 | Thangaraj et al. |
| 11,057,500 B2 | 7/2021 | Aragón et al. |
| 11,086,751 B2 | 8/2021 | Moresmau et al. |
| 11,172,042 B2 | 11/2021 | Bennet et al. |
| 11,269,660 B2 | 3/2022 | Yueh |
| 2002/0099952 A1 | 7/2002 | Lambert et al. |
| 2002/0103731 A1 | 8/2002 | Barnard et al. |
| 2002/0184610 A1 | 12/2002 | Chong et al. |
| 2002/0196277 A1 | 12/2002 | Bushey et al. |
| 2003/0046401 A1 | 3/2003 | Abbott et al. |
| 2003/0079052 A1 | 4/2003 | Kushnirskly |
| 2004/0003119 A1 | 1/2004 | Munir et al. |
| 2004/0003371 A1 | 1/2004 | Coulthard et al. |
| 2004/0078373 A1 | 4/2004 | Ghoneimy et al. |
| 2004/0128001 A1 | 7/2004 | Levin et al. |
| 2004/0153994 A1 | 8/2004 | Bates et al. |
| 2004/0177323 A1 | 9/2004 | Kaasila et al. |
| 2004/0267749 A1 | 12/2004 | Bhat et al. |
| 2005/0038764 A1 | 2/2005 | Minsky et al. |
| 2005/0065845 A1 | 3/2005 | DeAngelis |
| 2005/0235258 A1 | 10/2005 | Wason |
| 2005/0278695 A1 | 12/2005 | Synovic |
| 2006/0026591 A1* | 2/2006 | Backhouse ............ G06F 8/60 |
| | | 717/177 |
| 2006/0031854 A1 | 2/2006 | Godwin |
| 2006/0036448 A1 | 2/2006 | Haynie et al. |
| 2006/0036941 A1 | 2/2006 | Neil |
| 2006/0039466 A1 | 2/2006 | Emerson et al. |
| 2006/0111888 A1 | 5/2006 | Hiew et al. |
| 2006/0184925 A1 | 8/2006 | Ficatier et al. |
| 2006/0251047 A1 | 11/2006 | Shenfield et al. |
| 2006/0265719 A1 | 11/2006 | Asti |
| 2006/0271528 A1 | 11/2006 | Gorelik |
| 2006/0294151 A1* | 12/2006 | Wong ................ G06F 16/25 |
| 2007/0016624 A1 | 1/2007 | Powers et al. |
| 2007/0028286 A1 | 2/2007 | Greene et al. |
| 2007/0033637 A1 | 2/2007 | Yami et al. |
| 2007/0073671 A1 | 3/2007 | McVeigh et al. |
| 2007/0094594 A1 | 4/2007 | Matichuk |
| 2007/0135936 A1* | 6/2007 | Dumas .................. G06F 8/10 |
| | | 700/29 |
| 2007/0156764 A1 | 7/2007 | O'Connell et al. |
| 2007/0180367 A1* | 8/2007 | Chiang ............ G06F 16/9577 |
| | | 707/E17.121 |
| 2007/0180444 A1 | 8/2007 | Hoover et al. |
| 2007/0198450 A1 | 8/2007 | Khalsa |
| 2007/0208685 A1 | 9/2007 | Blumenau |
| 2007/0266394 A1 | 11/2007 | Odent et al. |
| 2007/0294406 A1 | 12/2007 | Suer et al. |
| 2008/0109292 A1 | 5/2008 | Moore |
| 2008/0126932 A1 | 5/2008 | Elad et al. |
| 2008/0141141 A1 | 6/2008 | Moore |
| 2008/0189617 A1 | 8/2008 | Covell et al. |
| 2008/0209390 A1 | 8/2008 | Dutta et al. |
| 2008/0229303 A1 | 9/2008 | Carteri et al. |
| 2008/0281727 A1 | 11/2008 | Moss |
| 2009/0024589 A1 | 1/2009 | Sood |
| 2009/0024660 A1 | 1/2009 | Borgsmidt et al. |
| 2009/0025063 A1 | 1/2009 | Thomas |
| 2009/0083306 A1 | 3/2009 | Sichi et al. |
| 2009/0094112 A1 | 4/2009 | Cesarini et al. |
| 2009/0124387 A1 | 5/2009 | Perlman et al. |
| 2009/0249290 A1 | 10/2009 | Jenkins et al. |
| 2009/0249446 A1 | 10/2009 | Jenkins et al. |
| 2010/0106560 A1* | 4/2010 | Li .......................... G06Q 10/06 |
| | | 705/347 |
| 2010/0114628 A1 | 5/2010 | Adler et al. |
| 2010/0131857 A1 | 5/2010 | Prigge |
| 2010/0153866 A1 | 6/2010 | Sharoni |
| 2010/0169265 A1* | 7/2010 | Ristock ............ G06Q 10/0637 |
| | | 705/320 |
| 2010/0225658 A1 | 9/2010 | Coleman |
| 2010/0226441 A1 | 9/2010 | Tung et al. |
| 2010/0231599 A1 | 9/2010 | Tung et al. |
| 2010/0245563 A1 | 9/2010 | Golovchinsky et al. |
| 2010/0250497 A1 | 9/2010 | Redlich et al. |
| 2010/0274815 A1* | 10/2010 | Vanasco ............ G06F 16/9024 |
| | | 707/798 |
| 2011/0004564 A1 | 1/2011 | Rolia et al. |
| 2011/0029947 A1 | 2/2011 | Markovic |
| 2011/0078708 A1 | 3/2011 | Dokovski et al. |
| 2011/0107298 A1 | 5/2011 | Sebastian |
| 2011/0107309 A1 | 5/2011 | Baron |
| 2011/0107313 A1 | 5/2011 | Baron |
| 2011/0246904 A1 | 10/2011 | Pinto et al. |
| 2011/0276636 A1 | 11/2011 | Cheng et al. |
| 2012/0072509 A1 | 3/2012 | Booth |
| 2012/0075333 A1 | 3/2012 | Chen et al. |
| 2012/0130906 A1 | 5/2012 | Klinker |
| 2012/0310381 A1 | 12/2012 | Karaffa |
| 2012/0310875 A1 | 12/2012 | Prahlad et al. |
| 2012/0324358 A1 | 12/2012 | Jooste |
| 2012/0331527 A1 | 12/2012 | Walters et al. |
| 2013/0031158 A1 | 1/2013 | Salsburg |
| 2013/0117662 A1 | 5/2013 | Shan et al. |
| 2013/0151557 A1 | 6/2013 | Shanken et al. |
| 2013/0174028 A1* | 7/2013 | Grossman ............... G06F 16/50 |
| | | 715/255 |
| 2013/0177662 A1 | 7/2013 | Msika |
| 2013/0275475 A1 | 10/2013 | Ahlborn |
| 2013/0332423 A1 | 12/2013 | Puri et al. |
| 2013/0339872 A1 | 12/2013 | Shuster |
| 2014/0026113 A1 | 1/2014 | Farooqi |
| 2014/0032875 A1 | 1/2014 | Butler |
| 2014/0047011 A1 | 2/2014 | Lahav et al. |
| 2014/0047413 A1* | 2/2014 | Sheive .................. G06F 8/33 |
| | | 717/110 |
| 2014/0075407 A1 | 3/2014 | Donis et al. |
| 2014/0089388 A1 | 3/2014 | Curry et al. |
| 2014/0114907 A1 | 4/2014 | Kozina et al. |
| 2014/0114962 A1 | 4/2014 | Rosenburg et al. |
| 2014/0207575 A1 | 7/2014 | Freed-Finnegan et al. |
| 2014/0245199 A1 | 8/2014 | Belotti et al. |
| 2014/0282453 A1 | 9/2014 | O'Rourke et al. |
| 2014/0288923 A1 | 9/2014 | Marian et al. |
| 2014/0288945 A1 | 9/2014 | Boerner et al. |
| 2014/0380105 A1 | 12/2014 | Michel et al. |
| 2015/0006543 A1 | 1/2015 | Jin et al. |
| 2015/0012478 A1 | 1/2015 | Mohammad et al. |
| 2015/0046930 A1 | 2/2015 | Phadke |
| 2015/0088933 A1 | 3/2015 | Schofield et al. |
| 2015/0127660 A1 | 5/2015 | Zilberberg et al. |
| 2015/0128105 A1 | 5/2015 | Sethi et al. |
| 2015/0248280 A1 | 9/2015 | Pillay |
| 2015/0271206 A1 | 9/2015 | Schultz et al. |
| 2015/0293764 A1 | 10/2015 | Visvanathan |
| 2015/0379303 A1 | 12/2015 | LaFever et al. |

(56) References Cited

U.S. PATENT DOCUMENTS

| | | |
|---|---|---|
| 2016/0026968 A1 | 1/2016 | Fan et al. |
| 2016/0034260 A1 | 2/2016 | Ristock et al. |
| 2016/0034571 A1 | 2/2016 | Setayesh et al. |
| 2016/0044380 A1 | 2/2016 | Barrett |
| 2016/0070541 A1 | 3/2016 | Lee et al. |
| 2016/0117159 A1 | 4/2016 | Balko |
| 2016/0140204 A1 | 5/2016 | Brown et al. |
| 2016/0253340 A1 | 9/2016 | Barth et al. |
| 2016/0267060 A1 | 9/2016 | Skirpa et al. |
| 2016/0267082 A1* | 9/2016 | Wong ............... G06F 16/164 |
| 2016/0275439 A1 | 9/2016 | Avats |
| 2016/0283200 A1 | 9/2016 | Standley et al. |
| 2016/0299933 A1 | 10/2016 | Fillipi et al. |
| 2016/0359711 A1 | 12/2016 | Deen et al. |
| 2017/0034306 A1 | 2/2017 | Thangeswaran |
| 2017/0039041 A1 | 2/2017 | Bommireddi |
| 2017/0068395 A1 | 3/2017 | Massoudi |
| 2017/0118284 A1 | 4/2017 | Chen et al. |
| 2017/0123751 A1 | 5/2017 | Sigurdsson et al. |
| 2017/0154026 A1 | 6/2017 | Gong et al. |
| 2017/0180284 A1 | 6/2017 | Smullen et al. |
| 2017/0199936 A1* | 7/2017 | Steelberg ........... G06F 16/9535 |
| 2017/0228119 A1 | 8/2017 | Hosbettu et al. |
| 2017/0269972 A1 | 9/2017 | Hosabettu et al. |
| 2017/0270022 A1* | 9/2017 | Moresmau ............ G06F 16/25 |
| 2017/0339564 A1 | 11/2017 | Momchilov et al. |
| 2017/0344227 A1 | 11/2017 | Stoicov et al. |
| 2017/0357814 A1* | 12/2017 | Mahaffey ............ G06F 21/554 |
| 2017/0372442 A1 | 12/2017 | Mejias |
| 2018/0060370 A1 | 3/2018 | Eshwar et al. |
| 2018/0089005 A1 | 3/2018 | Green |
| 2018/0121841 A1 | 5/2018 | Harris |
| 2018/0129497 A1 | 5/2018 | Biddle et al. |
| 2018/0167426 A1 | 6/2018 | Sigurdsson et al. |
| 2018/0174104 A1* | 6/2018 | Schikora ............. G06Q 10/103 |
| 2018/0191761 A1 | 7/2018 | Lee et al. |
| 2018/0197123 A1* | 7/2018 | Parimelazhagan ... G06F 16/951 |
| 2018/0322396 A1 | 11/2018 | Ahuja-Cogny et al. |
| 2018/0367506 A1 | 12/2018 | Ford et al. |
| 2019/0081935 A1 | 3/2019 | Broussard et al. |
| 2019/0129734 A1 | 5/2019 | Yang et al. |
| 2019/0158630 A1* | 5/2019 | Aragón ............... G06F 3/147 |
| 2019/0196793 A1 | 6/2019 | Jaiprakash |
| 2019/0205111 A1* | 7/2019 | Bennet ................ G06F 8/65 |
| 2019/0208031 A1* | 7/2019 | Bennet .............. G06F 9/45529 |
| 2019/0238467 A1 | 8/2019 | Guan et al. |
| 2019/0238688 A1 | 8/2019 | Bermundo et al. |
| 2019/0243742 A1* | 8/2019 | Natari ................ G06F 11/3608 |
| 2019/0332357 A1 | 10/2019 | Reddy |
| 2019/0342404 A1 | 11/2019 | Kundu et al. |
| 2019/0369969 A1 | 12/2019 | Donohoe et al. |
| 2020/0026735 A1 | 1/2020 | Przada |
| 2020/0042648 A1 | 2/2020 | Rao |
| 2020/0050983 A1 | 2/2020 | Balasubramanian et al. |
| 2020/0133982 A1 | 4/2020 | Thangeswaran et al. |
| 2020/0348964 A1 | 11/2020 | Anand et al. |
| 2020/0356365 A1 | 11/2020 | Pezaris |
| 2020/0409665 A1* | 12/2020 | Swaminathan ........... G06F 8/20 |
| 2021/0004711 A1 | 1/2021 | Gupta et al. |
| 2021/0019574 A1 | 1/2021 | Voicu |
| 2021/0037110 A1 | 2/2021 | Bennet et al. |
| 2021/0092154 A1* | 3/2021 | Kumar ................. H04L 51/12 |
| 2021/0107164 A1 | 4/2021 | Singh et al. |
| 2021/0109503 A1 | 4/2021 | Singh et al. |
| 2021/0109742 A1 | 4/2021 | Bennet et al. |
| 2021/0110345 A1 | 4/2021 | Iyer et al. |
| 2021/0117162 A1 | 4/2021 | Thangaraj et al. |
| 2021/0117210 A1 | 4/2021 | Yueh |
| 2021/0117302 A1 | 4/2021 | Kadakia et al. |
| 2021/0117517 A1 | 4/2021 | Bregman et al. |
| 2021/0117562 A1 | 4/2021 | Balan et al. |
| 2021/0117563 A1 | 4/2021 | Moresmau et al. |
| 2021/0117895 A1 | 4/2021 | Tondevold et al. |
| 2021/0120044 A1 | 4/2021 | Balan et al. |
| 2021/0194994 A1 | 6/2021 | Aragón et al. |
| 2021/0286597 A1 | 9/2021 | Thangaraj et al. |
| 2021/0357503 A1 | 11/2021 | Moresmau et al. |
| 2022/0060558 A1 | 2/2022 | Bennet et al. |
| 2022/0114267 A1 | 4/2022 | Schwartz et al. |
| 2022/0116787 A1 | 4/2022 | Balan et al. |

FOREIGN PATENT DOCUMENTS

| | | |
|---|---|---|
| EP | 3732566 | 11/2020 |
| EP | 3732582 | 11/2020 |
| WO | WO2008003593 A1 | 1/2008 |
| WO | WO2015139119 A1 | 9/2015 |
| WO | WO2015154133 A1 | 10/2015 |
| WO | WO2017147694 A1 | 9/2017 |
| WO | WO2017160831 A1 | 9/2017 |
| WO | WO2019099140 A1 | 5/2019 |
| WO | WO2019133208 A1 | 7/2019 |
| WO | WO2019133209 A1 | 7/2019 |
| WO | WO2020263573 A1 | 12/2020 |
| WO | WO2021076310 A1 | 4/2021 |
| WO | WO2021076311 A1 | 4/2021 |
| WO | WO2021076312 A1 | 4/2021 |
| WO | WO2021076324 A1 | 4/2021 |
| WO | WO2021076520 A1 | 4/2021 |
| WO | WO2021076521 A1 | 4/2021 |
| WO | WO2021076791 A1 | 4/2021 |
| WO | WO2021076921 A1 | 4/2021 |

OTHER PUBLICATIONS

"International Search Report" and "Written Opinion of the International Searching Authority," Patent Cooperation Treaty Application No. PCT/US2018/056196, dated Dec. 26, 2018, 8 pages.

"International Search Report" and "Written Opinion of the International Searching Authority," Patent Cooperation Treaty Application No. PCT/US2018/064127, dated Feb. 11, 2019, 6 pages.

"International Search Report" and "Written Opinion of the International Searching Authority," Patent Cooperation Treaty Application No. PCT/US2018/064122, dated Mar. 18, 2019, 8 pages.

"Extended European Search Report" and "Written Opinion", European Application No. 17767331.6, dated Nov. 14, 2019, 6 pages.

"International Search Report" and "Written Opinion of the International Searching Authority," Patent Cooperation Treaty Application No. PCT/US2020/037028, dated Aug. 28, 2020, 13 pages.

"International Search Report" and "Written Opinion of the International Searching Authority," Patent Cooperation Treaty Application No. PCT/US2020/053141, dated Jan. 12, 2021, 8 pages.

"International Search Report" and "Written Opinion of the International Searching Authority," Patent Cooperation Treaty Application No. PCT/US2020/053419, dated Jan. 14, 2021, 14 pages.

"International Search Report" and "Written Opinion of the International Searching Authority," Patent Cooperation Treaty Application No. PCT/US2020/053138, dated Jan. 12, 2021, 8 pages.

"International Search Report" and "Written Opinion of the International Searching Authority," Patent Cooperation Treaty Application No. PCT/US2020/053139, dated Jan. 11, 2021, 8 pages.

"International Search Report" and "Written Opinion of the International Searching Authority," Patent Cooperation Treaty Application No. PCT/US2020/056026, dated Jan. 19, 2021, 16 pages.

"International Search Report" and "Written Opinion of the International Searching Authority," Patent Cooperation Treaty Application No. PCT/US2020/055829, dated Jan. 19, 2021, 18 pages.

"International Search Report" and "Written Opinion of the International Searching Authority," Patent Cooperation Treaty Application No. PCT/US2020/055418, dated Jan. 28, 2021, 8 pages.

"International Search Report" and "Written Opinion of the International Searching Authority," Patent Cooperation Treaty Application No. PCT/US2020/055420, dated Feb. 1, 2021, 8 pages.

Bourgouin et al., "Towards a Process Analysis Approach to Adopt Robotic Process Automation", IEEE, 2018, 8 pages.

"Extended European Search Report" and "Written Opinion", European Application No. 18879227.9, dated Mar. 15, 2021, 9 pages.

"Extended European Search Report" and "Written Opinion", European Application No. 18895108.1, dated Aug. 19, 2021, 8 pages.

(56) References Cited

OTHER PUBLICATIONS

"Extended European Search Report" and "Written Opinion", European Application No. 18895245.1, dated Aug. 25, 2021, 8 pages.
"International Search Report" and "Written Opinion of the International Searching Authority," Patent Cooperation Treaty Application No. PCT/US2021/054415, dated Jan. 19, 2022, 8 pages.
Kuligowski, Kiely; "What Is a Document Repository?" business.com. [Retrieved on Dec. 12, 2021]; <URL: https://www.business.com/articles/what-is-document-repository/>, Jun. 25, 2020, 10 pages.
"International Search Report" and "Written Opinion of the International Searching Authority," Patent Cooperation Treaty Application No. PCT/US2021/054416, dated Jan. 19, 2022, 9 pages.
Choudhri et al., "PatientService: Electronic Patient Record Redaction and Delivery in Pervasive Environments." Proceedings 5th International Workshop on Enterprise Networking and Computing in Healthcare Industry (HealthCom), IEEE, Jul. 2003, 7 pages.

\* cited by examiner

MULTI-FACETED TRUST SYSTEM

CROSS-REFERENCE TO RELATED APPLICATIONS

This application claims priority of U.S. Provisional Patent Application No. 62/923,377 filed on Oct. 18, 2019, entitled "MULTI-FACETED TRUST SYSTEM," which is incorporated herein by reference in its entirety.

FIELD

This application relates generally to data processing and, more specifically, to systems and methods for determining multi-faceted trust scores for data.

BACKGROUND

Defensive data strategies, such as regulatory compliance, require a truth-based approach to understanding data that is both highly automated and accurate. Instituting the same approach for offensive data strategies, such as self-service data analytics, would be costly, time consuming, and even impossible in some situations (for example, when combining internal and external data).

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Provided are methods and systems for determining multi-faceted trust scores for data. In some embodiments, a method for determining multi-faceted trust scores for data may commence with receiving data and determining a plurality of metadata items associated with the data. The method may continue with determining one or more facets associated with each of the plurality of metadata items. The method may further include determining a parameter and a weight associated with each of the one or more facets. Upon determining the parameter and the weight, a trust score associated with each of the plurality of metadata items may be calculated based on the parameter and the weight associated with each of the one or more facets. The method may further include calculating a multi-faceted trust score of the data based on the trust score of each of the plurality of metadata items.

In some example embodiments, a system for determining multi-faceted trust scores for data may include a data collection unit, a data analyzing unit, and a score calculation unit. The data collection unit may be configured to receive data. The data analyzing unit may be configured to determine a plurality of metadata items associated with the data. The data analyzing unit may be further configured to determine one or more facets associated with each of the plurality of metadata items. The data analyzing unit may determine a parameter and a weight associated with each of the one or more facets. The score calculation unit may be configured to calculate a trust score associated with each of the plurality of metadata items based on the parameter and the weight associated with each of the one or more facets. The score calculation unit may be further configured to calculate a multi-faceted trust score of the data based on the trust score of each of the plurality of metadata items.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Exemplary embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, and other embodiments can be formed, by introducing structural and logical changes without departing from the scope of what is claimed. The following detailed description is, therefore, not to be taken in a limiting sense and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The present disclosure relates to systems and methods for determining multi-faceted trust scores for data. The system of the present disclosure provides an approach for understanding data in support of offensive data strategies that include augmenting truth (where available) with a dynamic trust model comprised of multiple facets. The system of the present disclosure can be used to analyze critical data components or other data items and determine a degree to which the data can be trusted by the users. The trust score can be calculated based on several factors, which are referred to herein as facets. More specifically, each of the facets includes a characteristic of a metadata item of data. The trust score is also referred to as a "score" herein.

The method for determining multi-faceted trust scores for data may commence with receiving data and determining a plurality of metadata items associated with the data. The method may continue with determining one or more facets associated with each of the plurality of metadata items. The method may further include determining a parameter and a weight associated with each of the one or more facets. In an example embodiment, the weight of a facet can be entered by an operator based on empirical observations or established using a predetermined technique based on historical trustworthiness associated of the facet. Upon determining facets and corresponding parameters and weights, a trust score for each of the plurality of metadata items can be calculated based on the parameter and the weight associated with each of the facets. The method can further include calculating a multi-faceted trust score of the data based on the trust score of each of the plurality of metadata items.

Thus, the trust score for a specific metadata item can be calculated based on different facets, which may include objective facets (metadata, data, business information), subjective facets (for example, based on ratings of a user), and synthetic facets (calculated from heuristics on lineage). All facets can be evaluated and scored. The facets contribute to the final score based on their relative weights.

A decision table may be used to determine which facets contribute to the trust score of a particular metadata item (i.e., to determine which facets to use and which weights to assign to each facet). The decision table can use an item type (for example, tables and columns are evaluated differently) and other criteria. The result of the decision is a list of selected facets with parameters and weights. The data intelligence (DI) repository may then calculate each facet based on the information the facet contains, using the parameters provided. For example, the DI repository may check if a business term was associated with the metadata item by determining whether the metadata item is tagged by the tag of type "Business Glossary." Other types of tags may also be referenced in the trust facet configuration. All scores can be then aggregated, taking into account the weights of each facet (some facets may contribute more than others to the final trust score). The final score and each individual facet score can be stored alongside the metadata item.

The score may be expressed as a percentage; for example, 100% means "complete trust" while 0% means "no trust at all." The user can visualize the score and how each facet contributed to the score in order to evaluate why the score is what it is and what caused the score to change over time. Thresholds can be associated with different levels of trust for more intuitive visualization; for example, a trust score of over 90% can be shown in green, under 50% can be shown in red, and so forth. Facet visualization may also be indicative of whether a facet is objective (such as a metadata field value), subjective (such as user ratings), or synthetic (for example, a facet calculated from heuristics on lineage).

The trust score calculation can be performed automatically when changes occur to the metadata item (for example, re-analysis of the metadata item, or manual tagging) or be triggered by the user. The DI repository may provide some trust configurations that can be readjusted based on specific needs. Other facets can be added to the facets provided by default.

Figure 1:
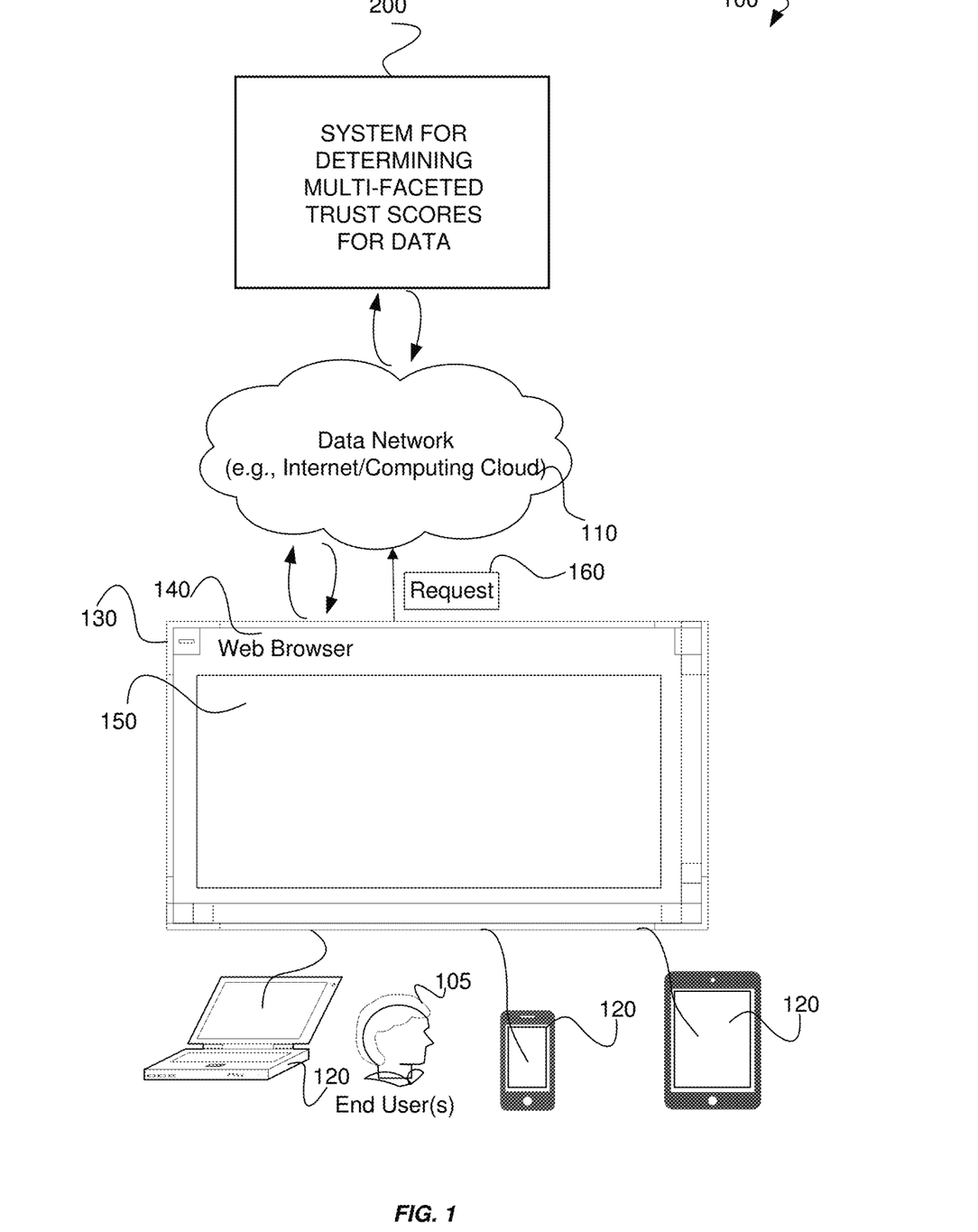
FIG. 1 illustrates an environment within which methods and systems for determining multi-faceted trust scores for data can be implemented, according to an example embodiment.

Referring now to the drawings, FIG. 1 illustrates an environment 100 within which systems and methods for determining multi-faceted trust scores for data can be implemented. The environment 100 may include a data network 110 (e.g., an Internet or a computing cloud), end user(s) 105, client device(s) 120 associated with the end user 105, and a system 200 for determining multi-faceted trust scores for data. Client device(s) 120 may comprise a personal computer (PC), a desktop computer, a laptop, a smartphone, a tablet, or so forth.

The client device 120 may have a user interface 130. Furthermore, a web browser 140 may be running on the client device 120 and displayed using the user interface 130. The web browser 140 may communicate with the system 200 via the data network 110.

The data network 110 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

The web browser 140 can render a web page associated with the system 200 which end user(s) 105 can use to calculate a trust score. The web browser 140 can establish a communication channel with the system 200 and generate and render virtual screens 150 based on data received from the system 200.

The end user 105 may send a request 160 to the system 200 using the client device 120. The request 160 may include data for which a trust score needs to be calculated. In response to the request 160, the system 200 may calculate the trust score and render the results by the web browser 140.

Figure 2:
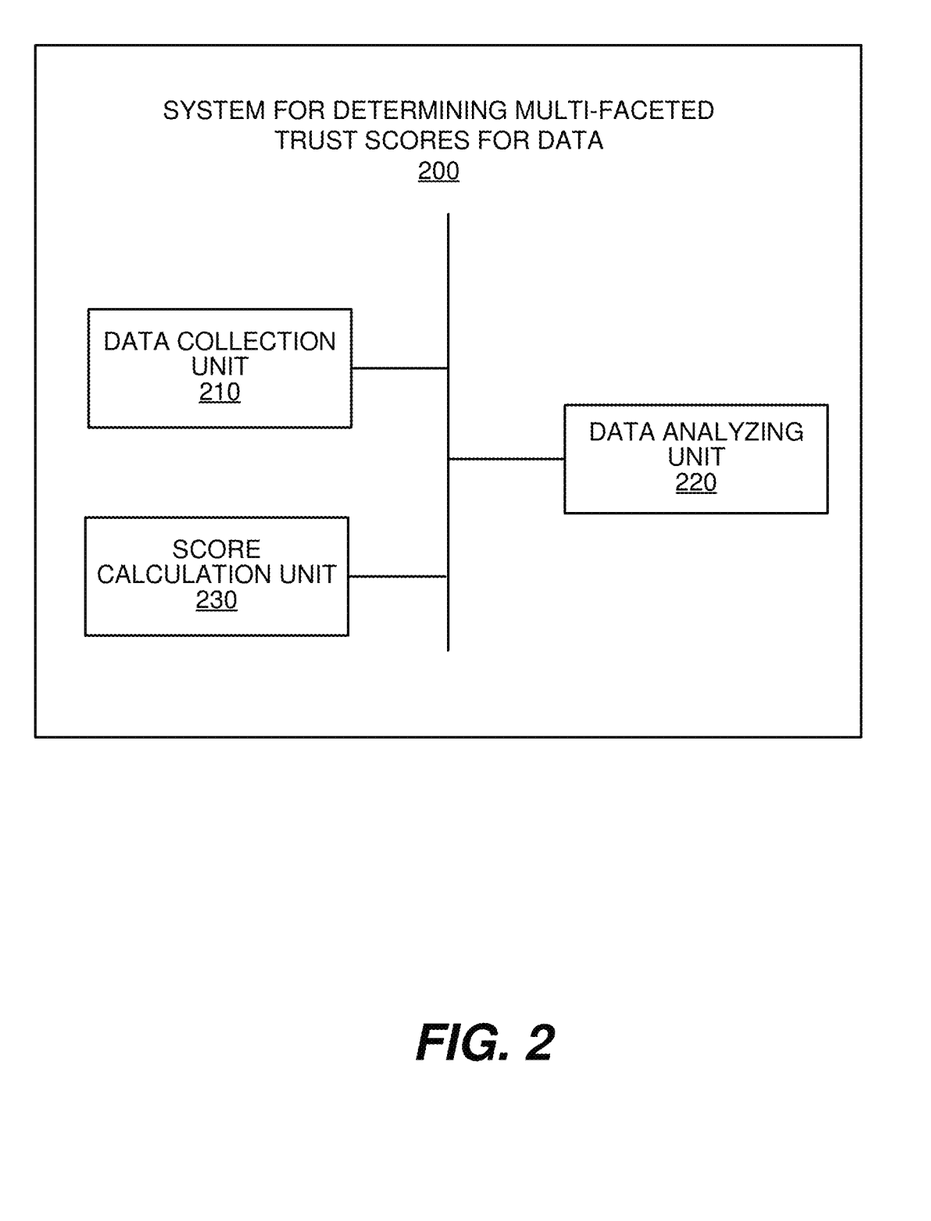
FIG. 2 is a block diagram illustrating a system for determining multi-faceted trust scores for data, according to an example embodiment.
Figure 5:
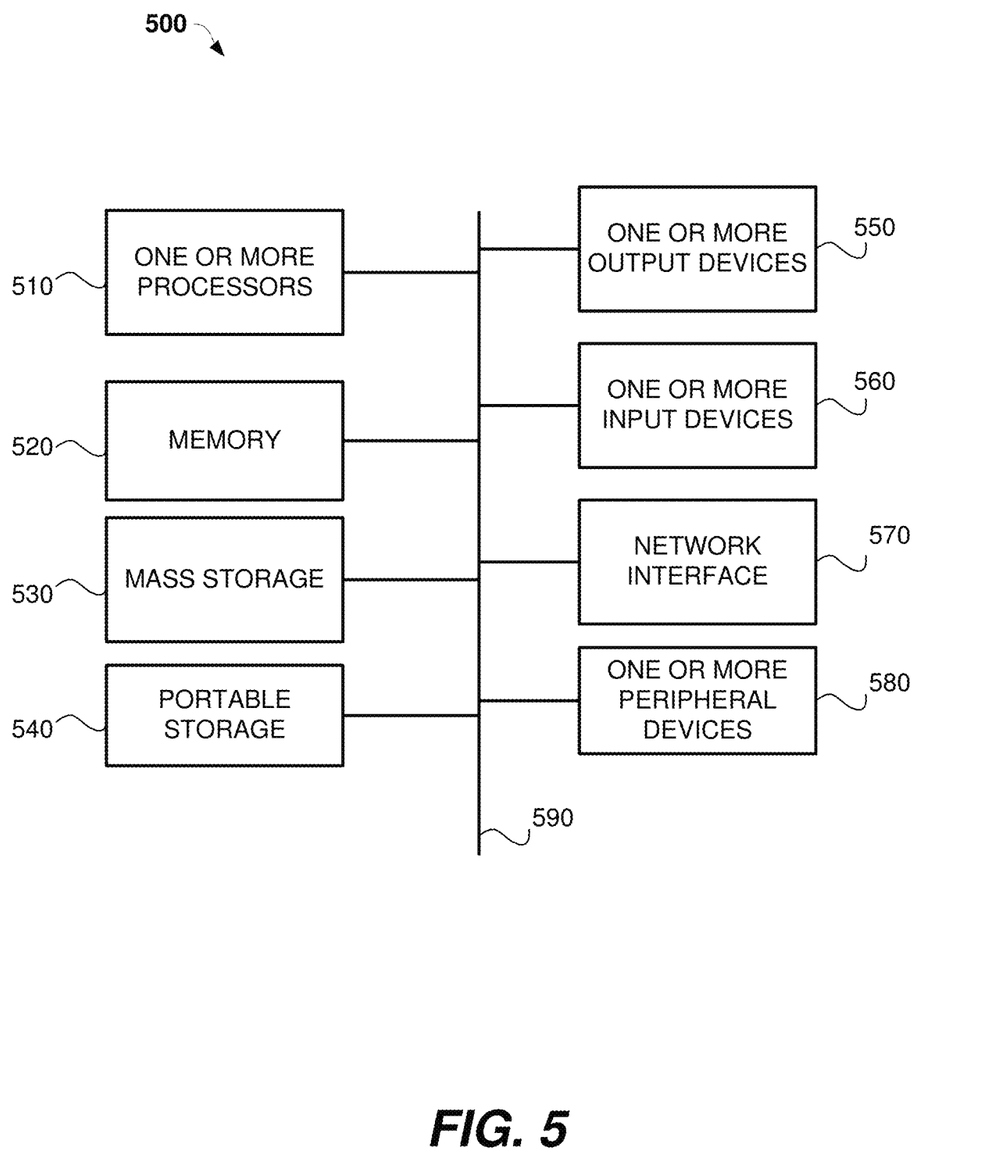
FIG. 5 is a computing system that can be used to implement a method for determining multi-faceted trust scores for data, according to an example embodiment.

FIG. 2 is a block diagram illustrating a system 200 for determining multi-faceted trust scores for data, according to an example embodiment. The system 200 may include a data collection unit 210, a data analyzing unit 220, and a score calculation unit 230. In an example embodiment, the operations performed by each of the data collection unit 210, the data analyzing unit 220, and the score calculation unit 230 may be performed by a processor and a memory for storing instructions executable by the processor. Example one or more processors 510 are shown in FIG. 5.

The operations performed by each of the data collection unit 210, the data analyzing unit 220, and the score calculation unit 230 of the system 200 are described in detail below with reference to FIG. 3.

Figure 3:
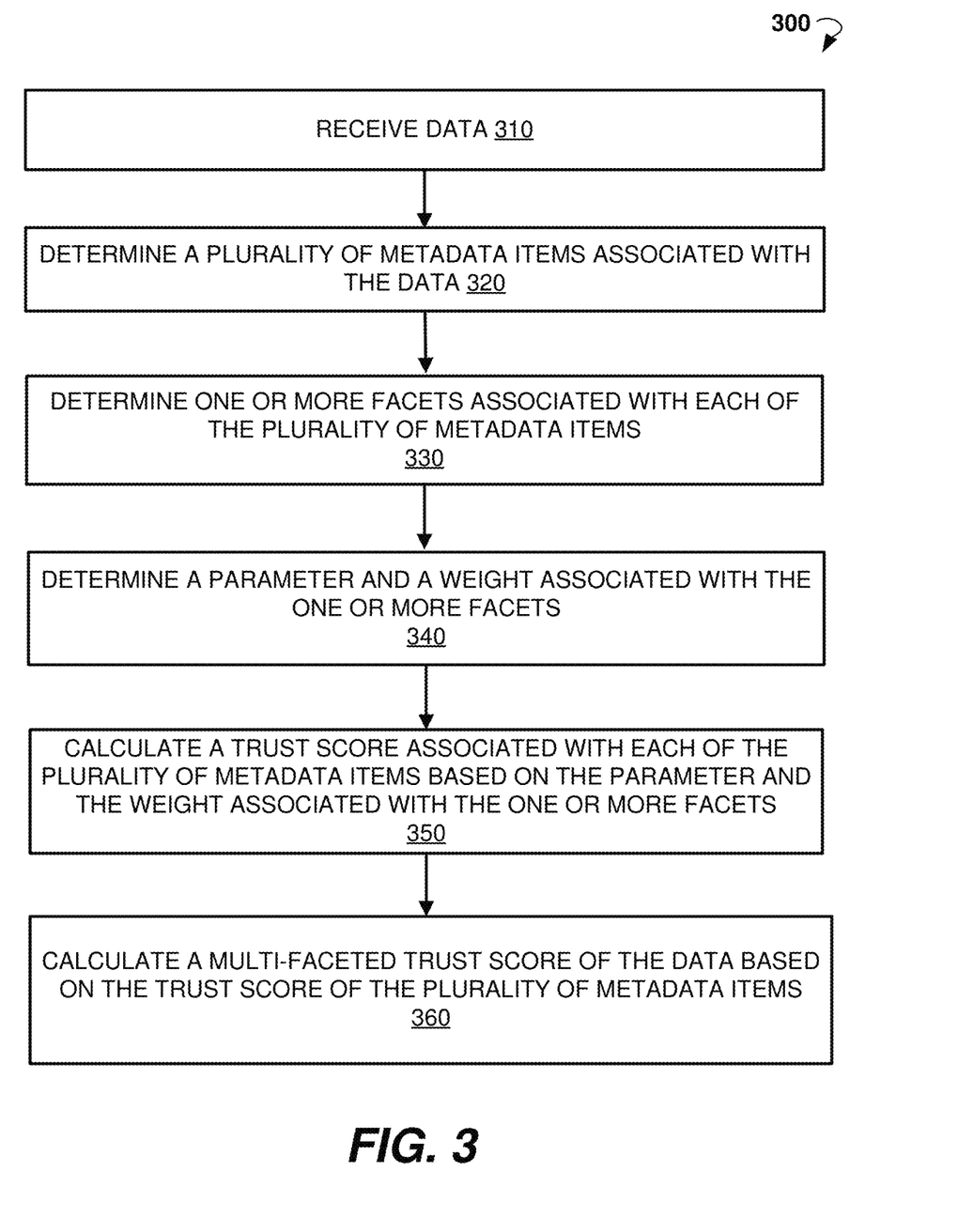
FIG. 3 is a flow diagram illustrating a method for determining multi-faceted trust scores for data, according to an example embodiment.

FIG. 3 shows a process flow diagram of a method 300 for determining multi-faceted trust scores for data, according to an example embodiment. In some embodiments, the operations may be combined, performed in parallel, or performed in a different order. The method 300 may also include additional or fewer operations than those illustrated. The method 300 may be performed by processing logic that may comprise hardware (e.g., decision making logic, dedicated logic, programmable logic, and microcode), software (such as software run on a general-purpose computer system or a dedicated machine), or a combination of both.

The method 300 may commence with the data collection unit receiving data at operation 310. The data may include any type of data that needs to be analyzed and for which a trust score is required to be determined. The data may be received from any source (for example, a database, a remote source, an online source, a cloud database, the system 200 itself, and so forth). At step 320, a plurality of metadata items associated with the data may be determined by the data analyzing unit. The metadata may include information associated with the data. The method 300 may further include determining, by the data analyzing unit, one or more facets associated with each of the plurality of metadata items at operation 330. In an example embodiment, each of the one or more facets includes a characteristic of a metadata item. The facets may include one of the following: data quality dimensions, criticality of an item of the data, governance of the item of the data (governed/not governed), a rating, a review, an issue, a proximity of the item of the data to a source (for example, how close the data item is to the source), an existence of a data lineage, a fact of scanning the item of the data from an active source or a spreadsheet, a tag associated with the data item, a frequency of update, a frequency of use, a null value, usefulness of the item of the data for an intended purpose, and so forth. The facets may include objective facets (metadata, data, business information), subjective facets (for example, based on ratings of a user), and synthetic facets (calculated from heuristics on lineage).

At operation 340, the data analyzing unit may determine a parameter and a weight associated with each of the one or more facets. The parameter may include, for example, a value of the facet, a 'yes/no' parameter, a percentage, a range, and so forth. The method 300 may continue at operation 350 with calculating, by the score calculation unit, a trust score for each of the plurality of metadata items based on the parameter and the weight associated with each of the one or more facets. In an example embodiment, the calculation may include summing all parameters of facets (related to the metadata item) multiplied by corresponding weights and dividing the summation by the number of facets related to the metadata item. The result can be a number between 0 and 1 or a percentage between 0% and 100%. Thereafter, at operation 360, the method 300 may proceed with calculating, by the score calculation unit, a multi-faceted trust score of the data based on the trust score of each of the plurality of metadata items. In an example embodiment, the calculation may include summing all trust scores of each of the plurality of metadata items and dividing the summation by the number of metadata items related to the data.

In an example embodiment, the method 300 may further include selecting, from the one or more facets, a plurality of facets that contribute to the trust score for each of the plurality of metadata items. In this embodiment, the calculation of the trust score for each of the plurality of metadata items may be based on the parameter and the weight associated with the selected plurality of facets.

Optionally, a trust score associated with each of the one or more facets may be calculated to obtain a plurality of trust scores for the one or more facets. The calculation may be based on the parameter and the weight associated with each of the one or more facets. In this embodiment, the trust score of each of the plurality of metadata items may be a sum of the plurality of trust scores of the one or more facets associated with each of the plurality of metadata items.

The method 300 may further include determining whether the multi-faceted trust score exceeds one or more predetermined thresholds. For example, the trust score that reached 100% threshold means "complete trust," while the trust score that reached 0% means "no trust at all." Thresholds can be associated with different levels of trust for more intuitive visualization; for example, a trust score that exceeded 90% threshold can be shown in green, a trust score that is under 50% threshold can be shown in red, and so forth.

Once the trust score is calculated, the trust score can be used as an input for a variety of use cases both inside a data intelligence product (e.g., a machine learning an artificial intelligence node) itself and also other products. The trust score can trigger predetermined actions when the trust score reaches specific thresholds for a metadata item and/or can be used in conjunction with other data intelligence information to provide additional information associated with the data. Trust scores can be also combined with (or constructed entirely from) sources outside of the data intelligence in order to drive additional information into data and decisions beyond the data intelligence.

In an example embodiment, the method 300 may further include determining that the data have been changed. The change may include at least one of the following: re-analysis of at least one item of the data, manual tagging of the data, a trigger initiated by a user, and so forth. Based on the determined change, the multi-faceted trust score may be recalculated for the data.

In an example embodiment, factors that contribute to the trust score can be defined in policies. Specifically, a policy type of "enrichment" can be defined and used for any data that can contribute additional data. The factors may include a type of the data item, a catalog in which the item is placed, and so forth. More factors can be added if additional fine-grained calculations are needed. The result of setting the policy is a list of "Trust Factors." A factor can define what data item needs to be considered and the relative weight of the factor in the overall calculation. The calculation for the given item may be done on the DI side; the policy only sets how to calculate the trust score.

In an example embodiment, the setting of a policy may be performed as follows. For items of type 'Table', quality with a weight of 20%, the average rating with a weight of 30%, the number of ratings (if more than two ratings) with a weight of 20%, and the fact that the item is tagged with a Glossary tag (a tag called Glossary or any sub tag) may add 30% to the score. In this example, all weights sum up to 1, but this is not required. Once the policy is set, the policy can be uploaded to a policy service upon running a configuration step (e.g., ConfigureDev script in a development environment).

Upon setting the policies, the trust score can be calculated by a backend service that reacts to events. The trust score and an explanation as to what factors contributed to the trust score can be displayed.

The trust factors may include the following facets: quality, ratings average, ratings count, tags, linked items, and so forth. The weight of each trust factor may be determined or set to get a range between 0 and 1.

Quality. The quality percentage score as calculated by the quality process (this is driven by configuration) may be taken. In particular, the percent divided by 100 may be taken.

Ratings average. When ratings go between 1 and 5, 3 is average. Thus, a rating of 1 results in a score of 0, a rating of 5 results in a score of 1, and a rating of 3 results in a score of 0.5.

Ratings count. There is a minimum value for the count of ratings to count (2 in the above example). If there are more, the score weighted by the count for each rating is calculated. Since ratings with low counts are filtered out, this can give a different result than the average.

Tags. The tag can include determining whether the item is tagged by any tag in the hierarchy of the given tag name. For example, any tag created from a glossary term may increase the trust factor, meaning that if an item is linked to a glossary term, it has been analyzed somewhat and is trusted more.

Linked items. The linked items may be taken and the average of their trust score can be calculated. For example, a dataset trust score may include the trust score of the items referenced by the dataset, the score of a table may include the score of each column, and so forth. The filter value is the name of the link to follow. Several links can be specified, delimited by commas. By default, links can be followed in both directions, but the link name may be prefixed, or indicate in, out, or both directions.

Trust calculation. The trust score can be calculated based on data stored in the DI repository and by using an application programming interface (API), depending on a facet. The trust score can be calculated when a specific event, such as a TrustUpdateRequestEvent, is received. The event may carry explicit item identifiers (IDs) to calculate the trust score only on these items, explicit query to calculate the trust score only on the items returned by the query, or nothing to calculate the trust score on all items in the catalog that have trust score policies linked to them.

Other events can be added to recalculate the trust score automatically when an item is changed, rated, tagged, and so forth.

When the calculation is done, another event, such as a TrustUpdatedEvent, can be sent. The TrustUpdatedEvent is a subclass of ItemUpdatedEvent, but carries the old and new trust score, such that a user interface (UI) can properly indicate that the item has been updated if the item has been viewed.

Based on the calculation, the trust score and a JavaScript Object Notation (JSON) Array containing information on how much each factor contributed in the trust factors attribute can be stored in the trust score attribute.

Trust API. A trust factors service can be provided to allow triggering a calculation of the trust score by sending the proper event (so the calculation is asynchronous).

Figure 4:
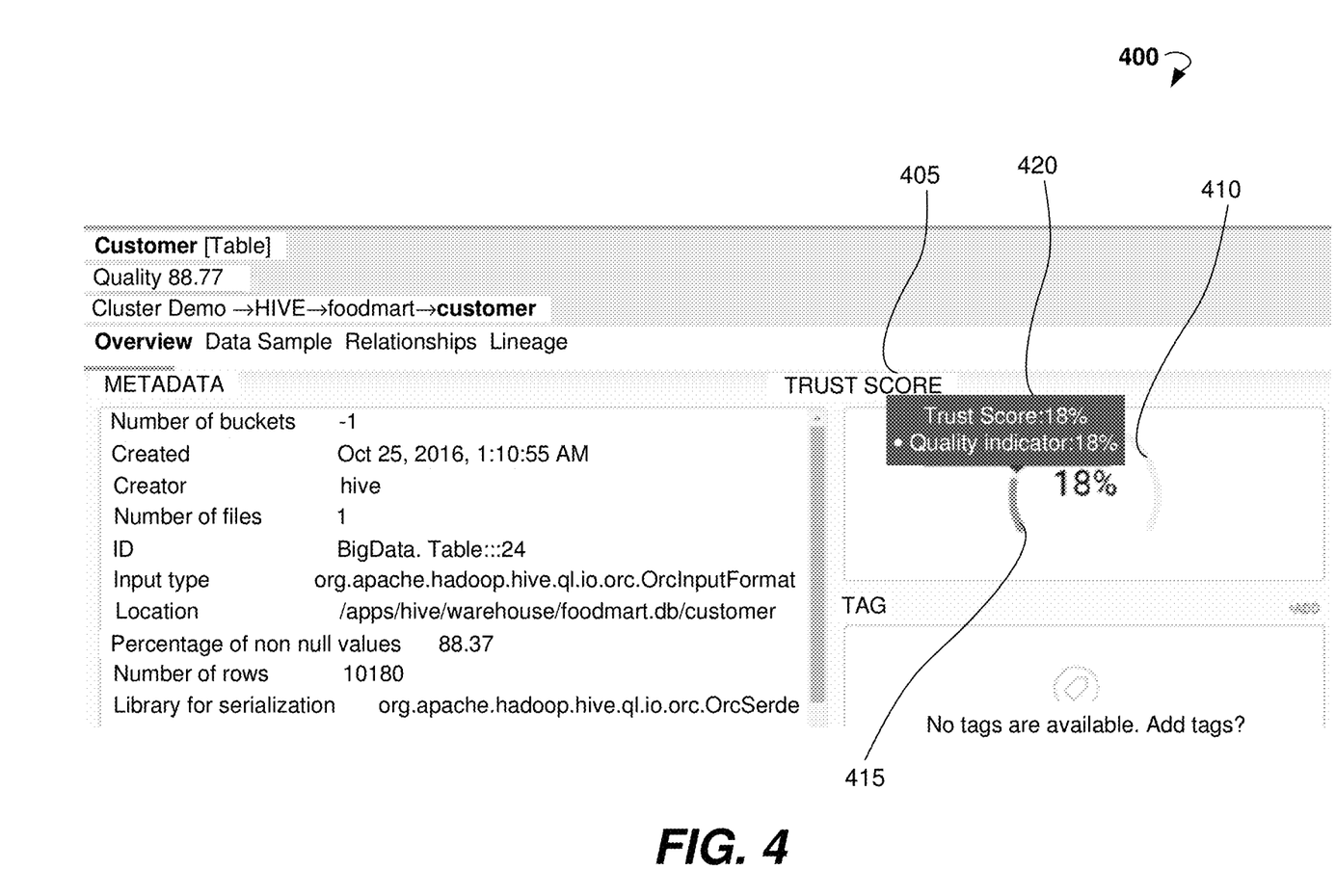
FIG. 4 is a schematic diagram showing a widget for calculating a trust score, according to an example embodiment.

FIG. 4 is a schematic diagram showing a widget 400 for calculating a trust score 405, according to an example embodiment. The UI may be using a chart 410, such as an ngx-chart (Gauge), to show the trust score 405 graphically. Red/yellow/green colors 415 may be shown based on the trust score 405 (green if over 90%, yellow if over 60%, and red otherwise). The colors can be configurable. Upon hovering over the chart 410 by the user, corresponding explanations 420 can be shown to the user. In an example embodiment, a widget, such as the widget 400 showing a trust score associated with the quality, can be shown in search results and the like.

FIG. 5 illustrates an exemplary computing system 500 that may be used to implement embodiments described herein. The exemplary computing system 500 of FIG. 5 may include one or more processors 510 and memory 520. Memory 520 may store, in part, instructions and data for execution by the one or more processors 510. Memory 520 can store the executable code when the exemplary computing system 500 is in operation. The exemplary computing system 500 of FIG. 5 may further include a mass storage 530, portable storage 540, one or more output devices 550, one or more input devices 560, a network interface 570, and one or more peripheral devices 580.

The components shown in FIG. 5 are depicted as being connected via a single bus 590. The components may be connected through one or more data transport means. The one or more processors 510 and memory 520 may be connected via a local microprocessor bus, and the mass storage 530, one or more peripheral devices 580, portable storage 540, and network interface 570 may be connected via one or more input/output buses.

Mass storage 530, which may be implemented with a magnetic disk drive or an optical disk drive, is a non-volatile storage device for storing data and instructions for use by a magnetic disk or an optical disk drive, which in turn may be used by one or more processors 510. Mass storage 530 can store the system software for implementing embodiments described herein for purposes of loading that software into memory 520.

Portable storage 540 may operate in conjunction with a portable non-volatile storage medium, such as a compact disk (CD) or digital video disc (DVD), to input and output data and code to and from the computing system 500 of FIG. 5. The system software for implementing embodiments described herein may be stored on such a portable medium and input to the computing system 500 via the portable storage 540.

One or more input devices 560 provide a portion of a user interface. The one or more input devices 560 may include an alphanumeric keypad, such as a keyboard, for inputting alphanumeric and other information, or a pointing device, such as a mouse, a trackball, a stylus, or cursor direction keys. Additionally, the computing system 500 as shown in FIG. 5 includes one or more output devices 550. Suitable one or more output devices 550 include speakers, printers, network interfaces, and monitors.

Network interface 570 can be utilized to communicate with external devices, external computing devices, servers, and networked systems via one or more communications networks such as one or more wired, wireless, or optical networks including, for example, the Internet, an intranet, LAN, WAN, cellular phone networks (e.g., Global System for Mobile communications network, packet switching communications network, circuit switching communications network), Bluetooth radio, and an IEEE 802.11-based radio frequency network, among others. Network interface 570 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 580 may include any type of computer support device to add additional functionality to the computing system. The one or more peripheral devices 580 may include a modem or a router.

The components contained in the exemplary computing system 500 of FIG. 5 are those typically found in computing systems that may be suitable for use with embodiments described herein and are intended to represent a broad category of such computer components that are well known in the art. Thus, the exemplary computing system 500 of FIG. 5 can be a PC, handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as random access memory (RAM). Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, various embodiments of methods and systems for determining multi-faceted trust scores for data have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

What is claimed is:

1. A method for determining multi-faceted trust scores for computer network data, the method comprising:
   receiving computer network data;
   determining a plurality of metadata items associated with the computer network data;
   determining one or more facets associated with each of the plurality of metadata items;
   determining which facets from among the one or more facets associated with each of the plurality of metadata items are to be selected from a decision table, wherein at least one of the one or more facets to be selected from the decision table is a subjective facet and wherein the decision table has a parameter and a weight associated with each of the one or more facets, the weight associated with each of the one or more facets in the decision table being based on one of an empirical observation or historical trustworthiness;
   calculating a trust score associated with each of the plurality of metadata items based on the parameter and the weight associated with each of the facets selected to be used from the decision table;
   calculating a multi-faceted trust score of the computer network data based on a sum of the individual trust scores of each of the plurality of metadata items, the trust scores contributing to the multi-faceted trust score based on their relative weights; and
   providing the multi-faceted trust score associated with the computer network data to a client device user display, the client device user display comprising:
   a chart, the chart being a gauge chart to show the multi-faceted trust score graphically and the chart including colors, the colors being based on the multi-faceted trust score and being green if the multi-faceted trust score is above ninety percent.

2. The method of claim 1, wherein each of the one or more facets includes a characteristic of a metadata item of the plurality of metadata items.

3. The method of claim 1, wherein the one or more facets includes one of the following: data quality dimensions, criticality of an item of the data, governance of the item of the data, a rating, a review, an issue, a proximity of the item of the data to a source, an existence of a data lineage, a fact of scanning the item of the data from an active source or a spreadsheet, a tag associated with item of the data, a frequency of update, a frequency of use, a null value, and usefulness of the item of the data for an intended purpose.

4. The method of claim 1, wherein the one or more facets include objective facets, and synthetic facets.

5. The method of claim 1, further comprising determining whether the multi-faceted trust score exceeds one or more predetermined thresholds.

6. The method of claim 1, further comprising:
   determining that the computer network data have been changed; and
   based on the determination, recalculating the multi-faceted trust score for the computer network data.

7. The method of claim 6, wherein the change includes at least one of the following: re-analysis of at least one item of the data, manual tagging of the data, and a trigger initiated by a user.

8. The method of claim 1, further comprising selecting, from the one or more facets, a plurality of facets that contribute to the trust score for each of the plurality of metadata items, wherein the calculating the trust score for each of the plurality of metadata items is based on the parameter and the weight associated with the selected plurality of facets.

9. The method of claim 1, further comprising calculating a trust score associated with each of the one or more facets to obtain a plurality of trust scores for the one or more facets, the calculation being based on the parameter and the weight associated with each of the one or more facets.

10. The method of claim 9, wherein the trust score of each of the plurality of metadata items is a sum of the plurality of trust scores of the one or more facets associated with each of the plurality of metadata items.

11. The method of claim 1, wherein the ninety percent is a predetermined threshold, the predetermined threshold triggering at least one predetermined action.

12. A system for determining multi-faceted trust scores for computer network data, the system comprising:
at least one processor configured to:
receive computer network data;
determine a plurality of metadata items associated with the computer network data;
determine one or more facets associated with each of the plurality of metadata items;
determine which facets from among the one or more facets associated with each of the plurality of metadata items are to be selected from a decision table, wherein at least one of the one or more facets to be selected from the decision table is a subjective facet and wherein the decision table has a parameter and a weight associated with each of the one or more facets, and the weight associated with each of the one or more facets in the decision table being based on one of an empirical observation or historical trustworthiness;
calculate a trust score associated with each of the plurality of metadata items based on the parameter and the weight associated with each of the facets selected to be used from the decision table;
calculate a multi-faceted trust score of the computer network data based on a sum of a individual trust scores of each of the plurality of metadata items, the trust scores contributing to the multi-faceted trust score based on their relative weights; and
provide the multi-faceted trust score associated with the computer network data to a client device user display, the client device user display comprising:
a chart, the chart being a gauge chart to show the multi-faceted trust score graphically and the chart including colors, the colors being based on the multi-faceted trust score and being green if the multi-faceted trust score is above ninety percent.

13. The system of claim 12, wherein the one or more facets includes one of the following: a data quality dimension, a criticality of an item of the data, governance of the item of the data, a rating, a review, an issue, a proximity of the item of the data to a source, an existence of a data lineage, a fact of scanning the item of the data from an active source or a spreadsheet, a tag associated with the data item, a frequency of update, a frequency of use, a null value, and usefulness of the item of the data for an intended purpose.

14. The system of claim 12, wherein the one or more facets include objective facets and synthetic facets.

15. The system of claim 12, wherein the at least one processor is further configured to determine whether the multi-faceted trust score exceeds one or more predetermined thresholds.

16. The system of claim 12, wherein the at least one processor is further configured to determine that the computer network data has been changed; and
recalculate, based on the determination, the multi-faceted trust score for the computer network data.

17. The system of claim 16, wherein the change includes at least one of the following: re-analysis of at least one item of the data, a manual tagging of the data, and a trigger initiated by a user.

18. The system of claim 12, wherein the at least one processor is further configured to select, from the one or more facets, a plurality of facets that contribute to the trust score for each of the plurality of metadata items, wherein the calculating of the trust score for each of the plurality of metadata items is based on the parameter and the weight associated with the selected plurality of facets.

19. The system of claim 12, wherein the at least one processor is further configured to calculate a trust score associated with each of the one or more facets to obtain a plurality of trust scores for the one or more facets, the calculation being based on the parameter and the weight associated with each of the one or more facets.

20. The system of claim 19, wherein the trust score of each of the plurality of metadata items is a sum of the plurality of trust scores of the one or more facets associated with each of the plurality of metadata items.

21. The system of claim 12, wherein the ninety percent is a predetermined threshold, the predetermined threshold triggering at least one predetermined action.

22. A system for determining multi-faceted trust scores for computer network data, the system comprising:
at least one processor configured to:
receive computer network data;
determine a plurality of metadata items associated with the computer network data;
determine one or more facets associated with each of the plurality of metadata items;
determine which facets from among the one or more facets associated with each of the plurality of metadata items are to be selected from a decision table, wherein at least one of the one or more facets to be selected from the decision table is a subjective facet and wherein the decision table has a parameter and a weight associated with each of the one or more facets, the weight associated with each of the one or more facets in the decision table being based on one of an empirical observation or historical trustworthiness;
select, from the one or more facets, a plurality of facets that contribute to the trust score for each of the plurality of metadata items;
calculate a trust score associated with each of the plurality of metadata items based on the parameter and the weight associated with each of the facets selected to be used, wherein the calculating of the trust score for each of the plurality of metadata items is based on the parameter and the weight associated with the selected plurality of metadata items;
calculate a trust score associated with each of the facets to be used to obtain a plurality of trust scores of the facets to be used, the calculation being based on the parameter and the weight associated with each of the facets to be used;

calculate a multi-faceted trust score of the computer network data based on the trust score of each of the plurality of metadata items, the trust scores contributing to the multi-faceted trust score based on their relative weights; and provide the multi-faceted trust score with the computer network data to a client device user display, the client device user display comprising:

a chart, the chart being a gauge chart to show the multi-faceted trust score graphically and the chart including colors, the colors being based on the multi-faceted trust score and being green if the multi-faceted trust score is above ninety percent.

23. The system of claim 22, wherein the ninety percent is a predetermined threshold, the predetermined threshold triggering at least one predetermined action.

* * * * *